(12) United States Patent
Marchese

(10) Patent No.: US 6,562,174 B2
(45) Date of Patent: May 13, 2003

(54) METHOD FOR APPLYING TO A SUPPORT MULTIPLE ARTICLES HELD IN PROTECTIVE ELEMENTS

(76) Inventor: Maria Concetta Marchese, Via Berlinguer, 15, Casarile (IT)

(*) Notice: Subject to any disclaimer, the term of this patent is extended or adjusted under 35 U.S.C. 154(b) by 120 days.

(21) Appl. No.: 09/827,450

(22) Filed: Apr. 6, 2001

(65) Prior Publication Data

US 2001/0049015 A1 Dec. 6, 2001

(30) Foreign Application Priority Data

May 15, 2000 (IT) .......................... MI00A1067

(51) Int. Cl.[7] .............................. B32B 31/00; B65B 7/28
(52) U.S. Cl. ...................... 156/267; 156/268; 156/270; 53/289; 53/370.4
(58) Field of Search .................... 156/69, 267, 268, 156/269, 270; 53/282, 289, 329.3, 329.4, 329.5, 370.4, 370.5

(56) References Cited

U.S. PATENT DOCUMENTS

| 3,457,699 A | * | 7/1969 | Kinney et al. ............. 53/329.4 |
| 3,654,746 A | * | 4/1972 | Beckers ...................... 206/499 |
| 3,733,768 A | * | 5/1973 | Carls et al. ................. 206/561 |
| 3,894,896 A | * | 7/1975 | Watanabe .................... 156/211 |
| 4,258,529 A | * | 3/1981 | Smith ........................... 53/478 |
| 4,357,192 A | * | 11/1982 | Moser ......................... 156/252 |
| 4,819,412 A | * | 4/1989 | Sengewald ................... 53/282 |
| 5,191,181 A | * | 3/1993 | Regenscheid ............ 156/379.7 |
| 5,334,272 A | * | 8/1994 | Takata et al. ................ 156/268 |
| 5,887,747 A | * | 3/1999 | Burklin et al. ......... 156/244.11 |
| 6,070,507 A | * | 6/2000 | Mihalov et al. ............. 264/153 |
| 6,079,189 A | * | 6/2000 | Sloot ........................... 493/90 |
| 6,138,439 A | * | 10/2000 | McMahon et al. ......... 53/133.4 |

* cited by examiner

Primary Examiner—Mark A. Osele
(74) Attorney, Agent, or Firm—Hedman & Costigan, P.C.

(57) ABSTRACT

A method for applying to a support multiple articles held in protective elements comprises the following steps: thermoforming a thin plastic material sheet to provide a plurality of hollow recesses therein, introducing into the recesses a plurality of articles, applying to the recesses a closure film, coupling to the closure film a multilayer strip including a first film element which can be bound to the closure film, an adhesive layer and a siliconized paper layer, the method further including a die-cutting step for die-cutting material portion encompassing the recesses and removing the waste material including all the mentioned layers, with the exception of the siliconized paper layer.

11 Claims, 3 Drawing Sheets

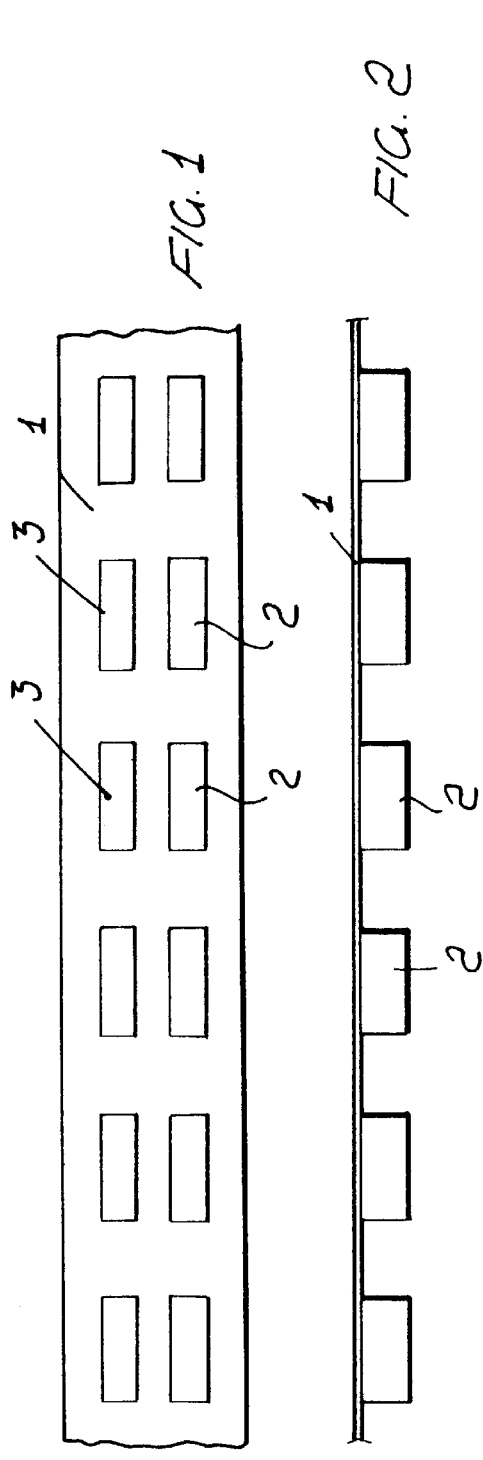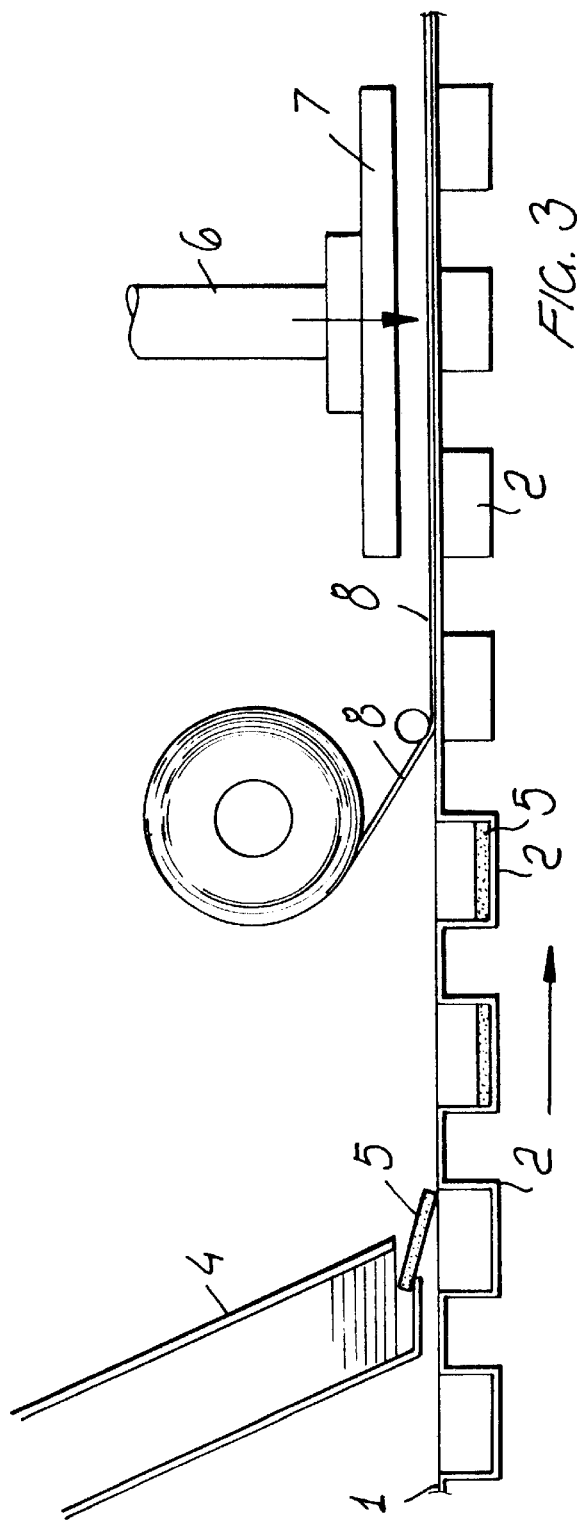

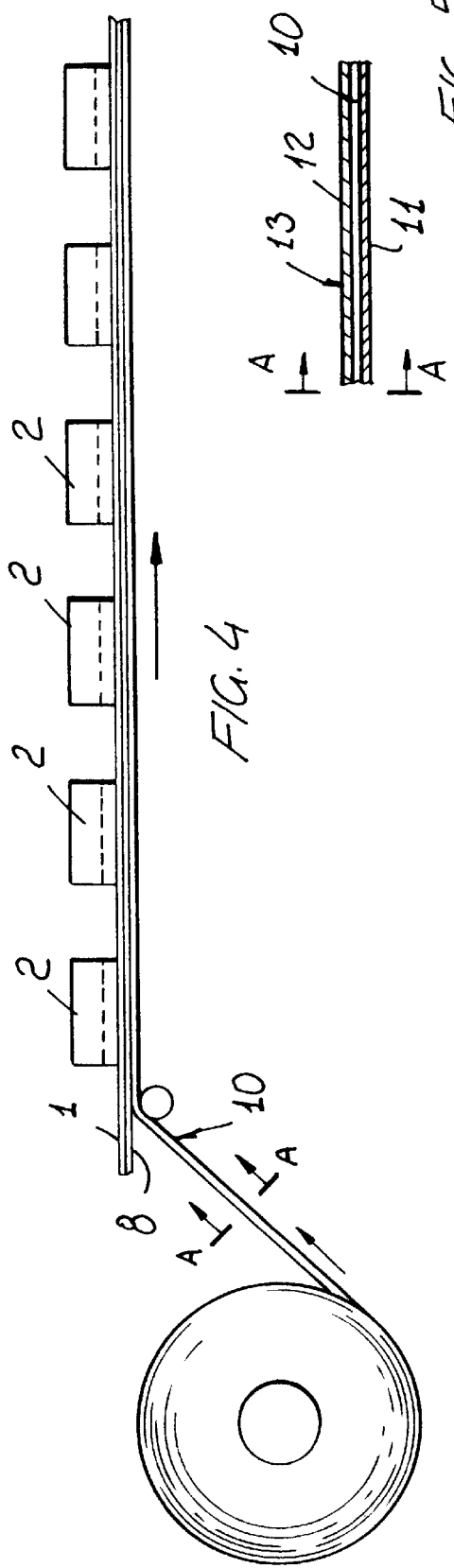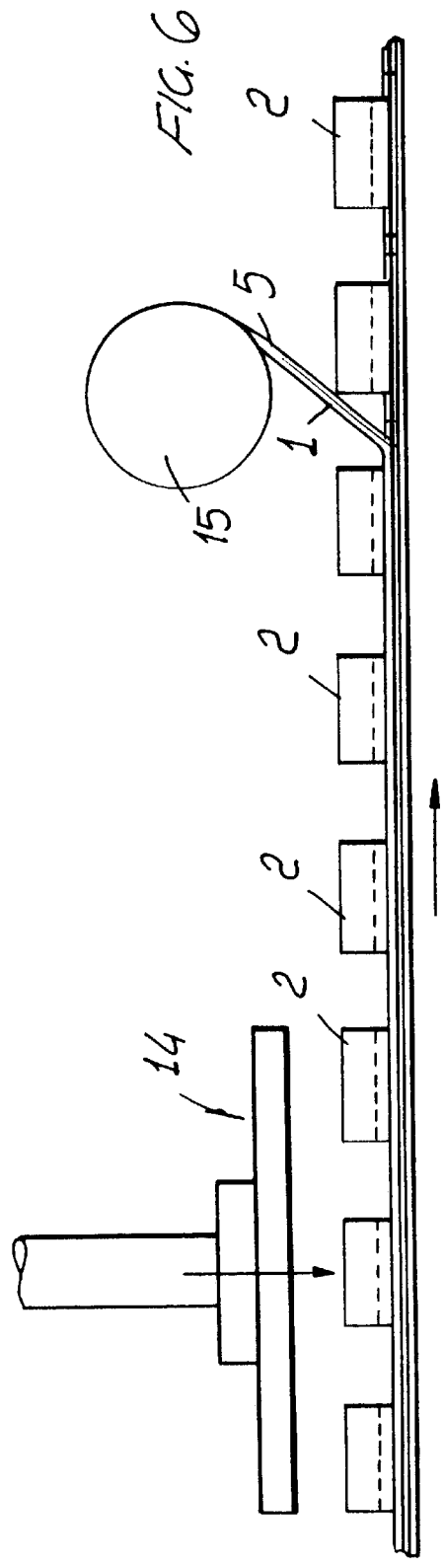

METHOD FOR APPLYING TO A SUPPORT MULTIPLE ARTICLES HELD IN PROTECTIVE ELEMENTS

BACKGROUND OF THE INVENTION

The present invention relates to a method for applying to a support a plurality of articles, held in protective elements; the invention also relates to the article of manufacture made by the inventive method.

As is known, a very important problem in several manufacturing fields is that of providing the market with promotional products or samples, so packaged as to be clearly visible.

In order to preserve the above promotional products or samples, they must be properly protected from the outside environment or from a contact with outer agents in general; moreover, said articles must be held in a properly separated relationship from one another.

The above mentioned requirements are additional to a lot of other packaging requirements to be daily met by manufacturing companies, and the present invention set outs to provide a definitive solution to the packaging problems affecting a lot of small or very small size articles which must be packaged in a loose condition.

Actually, multiple articles characterizing a single large size object must be reunited to provide a single good.

A first element or article, for example, can comprise a package or vessel or other element; a second article can comprise the product self which can be provided either in a packaged or non packaged condition. A further article can comprise a promotional gift very different from said further article with respect to its size, functionality and/or nature.

Prior approaches provide to use coupling methods for coupling several articles to supporting elements.

On the other hand, said prior methods have been found not fully satisfactory since they could not provide a firm coupling of the several involved articles.

SUMMARY OF THE INVENTION

Accordingly, the aim of the present invention is to provide a method for applying multiple articles to a support element, said multiple articles being held in a protective element, thereby allowing to connect said articles by adhesion, while greatly simplifying the method steps and assuring a firm coupling between the plurality of articles and the support therefor.

Within the scope of the above mentioned aim, a main object of the present invention is to provide such a method and related article of manufacture allowing the desired articles to be coupled either manually or mechanically, with an automation of the overall processing operation.

Another object of the present invention is to provide such a method for applying to a support a plurality of articles, held in protective elements which is very reliable and safe in operation.

Yet another object is to provide such a method which is very competitive from a mere economic standpoint.

Yet a further object of the present invention is to provide such a method which can be easily carried out by using easily available elements and materials.

According to one aspect of the present invention, the above mentioned aim and objects, as well as yet other objects, which will become more apparent hereinafter, are achieved by a method for applying to a support a plurality of articles, held in protective elements, characterized in that said method comprises two main steps.

A first step comprises three basic operations, that is: I) processing, usually thermically, a thin plastic material sheet in order to provide a plurality of recesses therein, II) introducing into each of said recesses one or more articles to be packaged and III) applying a closing film to said recesses.

The second step comprises three basic operations, consisting of coupling to said closure film a strip including several layers such as: a first layer constituted by a supporting film adapted to be coupled to said closure film, a second adhesive layer and a last layer comprising a siliconized paper; die-cutting regions encompassing said recesses; removing waste material of all the used materials, with the exception of the siliconized paper and comprising the thin plastic material sheet, the closure film and the multi-layer strip.

BRIEF DESCRIPTION OF THE DRAWINGS

Further characteristics and advantages of the present invention will become more apparent hereinafter from the following disclosure of preferred, though not exclusive, embodiment of a method for applying to a support a plurality of articles held in protective elements, and being illustrated, by way of an indicative but not limitative example, in the accompanying drawings, where:

FIG. 1 is a schematic top plan view illustrating the thermoformed plastic material thin sheet, including a plurality of recesses, according to the present invention;

FIG. 2 is an elevation view illustrating the thermoformed plastic material sheet;

FIG. 3 illustrates an introduction step in which articles to be packaged are introduced into the recesses of the thermoformed plastic material sheet and in which a closure film is applied to said recesses, according to the invention;

FIG. 4 schematically illustrates a coupling step for coupling a multilayer strip;

FIG. 5 is a cross-sectional view substantially taken along the cross-line A—A of FIG. 4;

FIG. 6 illustrates a die-cutting step, in which regions about said recesses are die-cut and the waste material is removed therefrom, also according to the present invention;

DESCRIPTION OF THE PREFERRED EMBODIMENT

Figure 7:
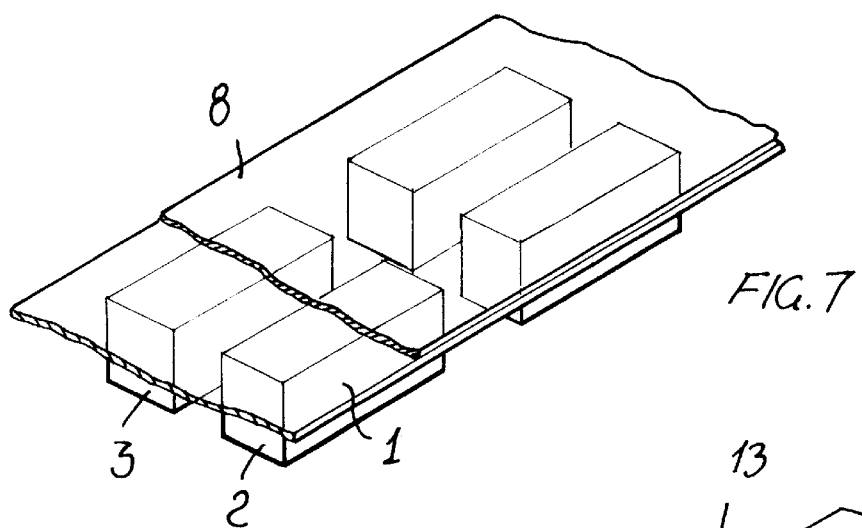
FIG. 7 is a perspective layered view of the plastic material sheet to which the closure film is applied.
Figure 8:
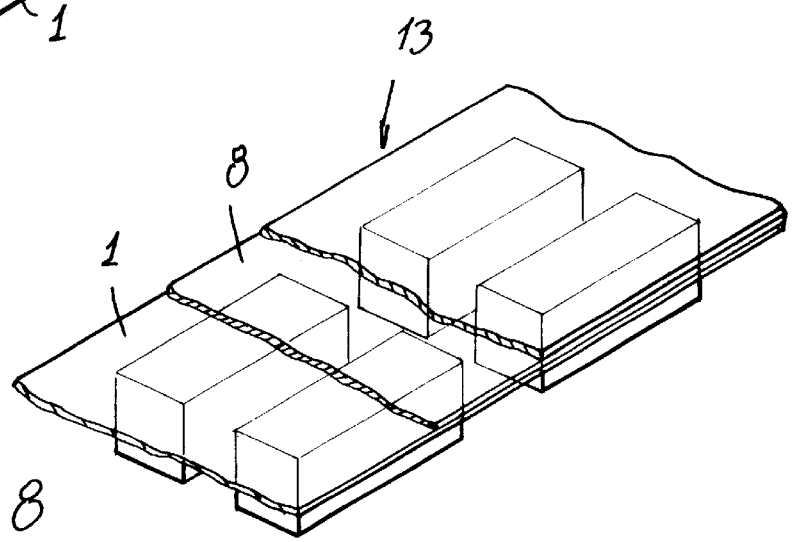
FIG. 8 is a further perspective layered view, like FIG. 7, but with a further provision of the multilayer strip or web.
Figure 9:
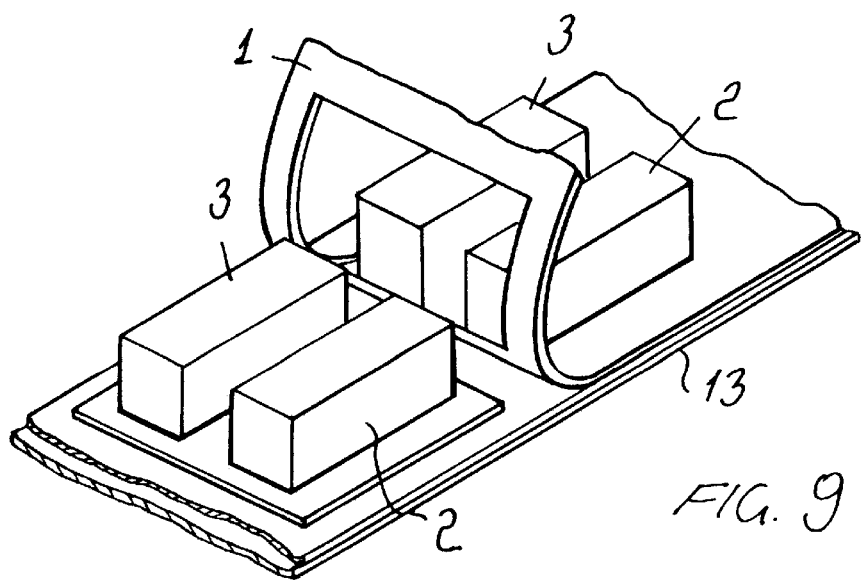
FIG. 9 illustrates a removing step for removing waste materials.

With reference to the number references of the above mentioned figures, the method for applying to a support a plurality of articles, held in protective elements, according to the present invention, comprises the use of a thin plastic material sheet 1, preferably made of PVC, PET, polypropylene or the like, which is patterned or thermoformed by a pressure molding process or a vacuum thermoforming process, to provide a plurality of hollow recesses 2 and 3 designed for holding therein the articles to be packaged.

Known types of apparatus will arrange the individual recesses with respect to a loading station 4 in order to allow the respective articles 5 to be packaged to be properly introduced into said recesses.

Upon engaging said articles 5 in said recesses, a closure film 8, either hot sealed, cold sealed or ultrasound sealed by a suitable apparatus 6 is applied, said apparatus 6 having a specifically designed surface 7 adapted to seal the overall surface of said closure film, with the exception of the recess region.

Then, said articles 5 will be perfectly sealed in said recesses 2 and 3.

The thus made article of manufacture is then preferably turned through 180° in order to apply to it, by a suitable driving force applied by known sliding belts, a multilayer strip 13.

More specifically, the multilayer strip 13 will contact the closure film 8 through a surface layer 10 thereof, having such a molecular characteristic adapted to provide a perfect adhesion or binding with the closure film 8, said closure being facilitated by applying a suitable adhesive material.

The adhesive material for firmly coupling the closure film 8 to the surface layer 10 of the multilayer strip 13 is delivered by a dispenser, arranged upstream of the two materials, or by suitable hot, or pressure, or ultrasound operating guns.

As shown, the strip 13 comprises an adhesive material layer 12 arranged at an intermediate position with respect to the layer 10, and a further outer layer 11 made of a polyethene processed paper material.

Upon coupling, a die-cutting apparatus, schematically indicated by the reference number 14, is operated for die-cutting the plastic material sheet 1, while leaving about the recesses 2 and 3 a flange pattern.

The die-cut operation will affect, in addition to the sheet 1, also the closure film 8 and the layers 10 and 12, without affecting the polyethene processed paper layer 11.

Upon ending the die-cutting step, the waste material is removed by a rotary roller 15, on which the exceeding plastic material, arranged in the regions between the recesses, is wound and removed.

The thus obtained article of manufacture, which constitutes the subject matter of the present invention, is then subjected to finishing operations and, if required, it is recoiled or zig-zag folded, for shipment and for a possible provided use.

In the case of articles having a small thickness, less than 0.5 mm, the subject article of manufacture can also be formed by directly starting from the multilayer strip 13, on the film 10 of which the article to be packaged will be directly arranged, with an optional application of a removable adhesive material, allowing said article to be held at a desired position.

Then, a closure film like the above disclosed closure film 8 will be applied, for example by a hot-blade sealing process or by using an ultrasound apparatus, or a hot or cold glueing apparatus.

Upon ending the above mentioned step, the article of manufacture will be subjected to a die-cut operation for removing the closure film, and the other films with the exception of the polythene processed paper material, which will operate as a joining elements.

From the above disclosure it should be apparent that the invention fully achieves the intended aim and objects.

In particular, the fact is to be pointed out that a very simple and functional method has been provided for packaging, in preformed recesses, articles which are held visually and spatially joined to other articles.

The invention, as disclosed, is susceptible to several modifications and variations, all of which will come within the scope of the invention.

Moreover, all of the constructional details can be replaced by other technically equivalent elements.

In practicing the invention, the used materials, constructional details as well as the contingent size and shapes, can be any, depending on requirements.

What is claimed is:

1. A method for applying to a support a plurality of articles, held in protective elements characterized in that said method comprises the steps of: thermoforming a thin plastic material sheet to form a plurality of hollow recesses therein, introducing into said recesses a plurality of articles, applying a closure film to said recesses, coupling to said closure film a supporting multilayer strip including a first film to be bound to the closure film, an adhesive layer and a siliconized paper layer.

2. A method according to claim 1, characterized in that said method further comprises a die-cutting step, for die-cutting regions about said recesses, and removing waste materials while leaving said siliconized paper layer.

3. A method according to claim 1, characterized in that said plastic material sheet, with said hollow recesses formed therein, is slidably driven so as to locate said recesses at a loading station for introducing said articles into said recesses.

4. A method according to claim 1, characterized in that said closure film is applied by a sealing process for sealing said closure film with the exception of said recesses, thereby sealing said articles in said recesses.

5. A method according to claim 1, characterized in that said sheet and closure film are moved as an assembly at least 180° before coupling said assembly to said supporting multilayer strip.

6. A method according to claim 1, characterized in that said closure film and a surface layer of said supporting multilayer strip have complimentary molecular characteristics designed for providing a full adhesive bond.

7. A method according to claim characterized in that said closure film is firmly coupled to a surface layer of said supporting multilayer strip through an adhesive material supplied by an adhesive material dispenser.

8. A method according to claim 1, characterized in that an intermediate layer of said supporting multilayer strip comprises an adhesive material and that an outer layer of said strip is a siliconized paper.

9. A method according to claim 1, characterized in that a supporting multilayer strip or web is used for supporting an article of manufacture comprising a thermoformed sheet and recesses holding therein a plurality of sealed articles, said articles being sealed by a closure film therewith the support means is made rigid by an adhesive material and in that a die-cutting step is performed for removing regions about said recesses.

10. A method according to claim 9, characterized in that said die-cutting step affects said plastic material sheet, said closure sheet and the layers of said strips with the exception of a siliconized paper layer thereof.

11. A method according to claim 9, characterized in that said die-cutting step leaves about said recesses a layered material flange pattern.

\* \* \* \* \*